Patented June 19, 1934

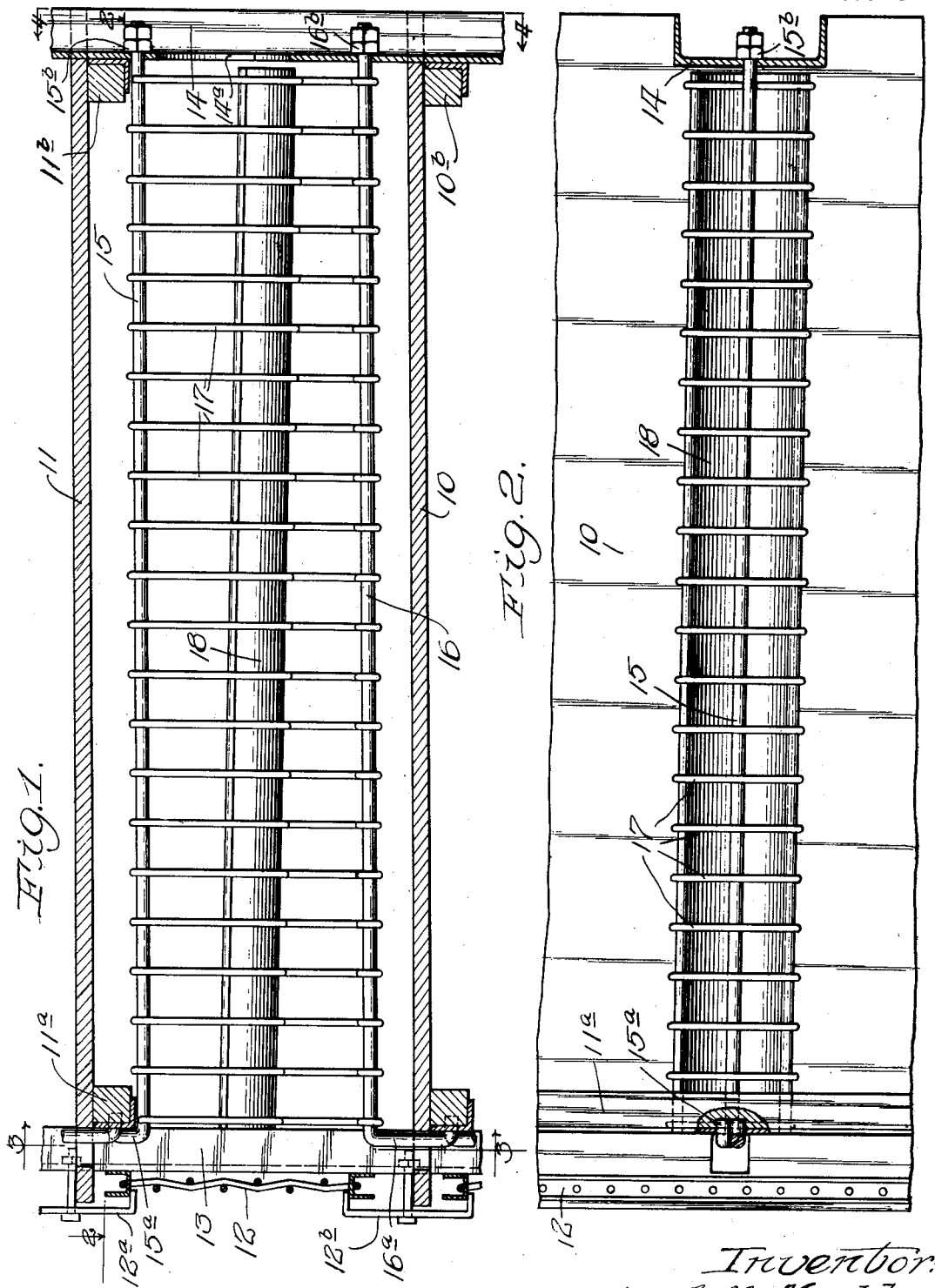

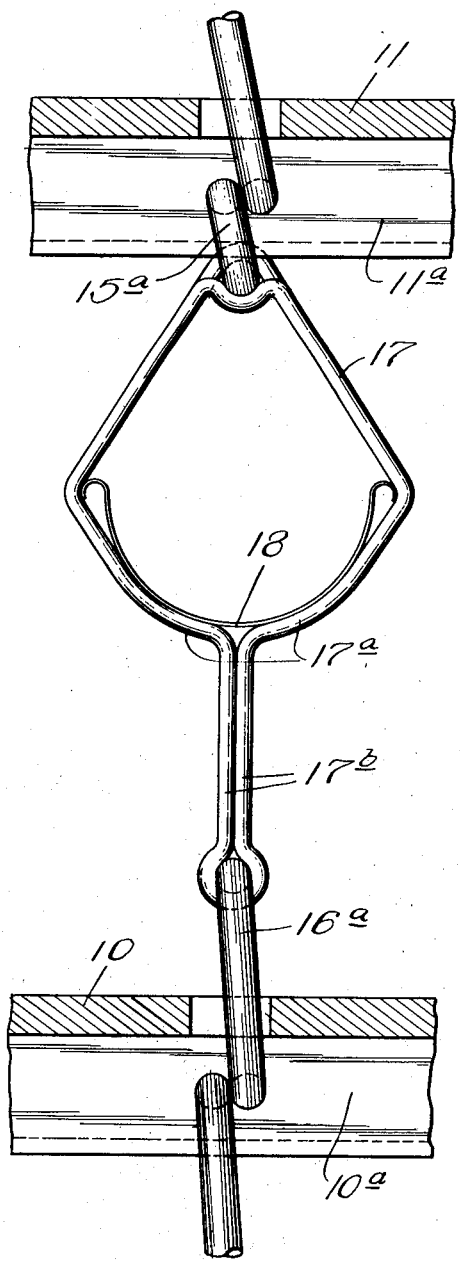
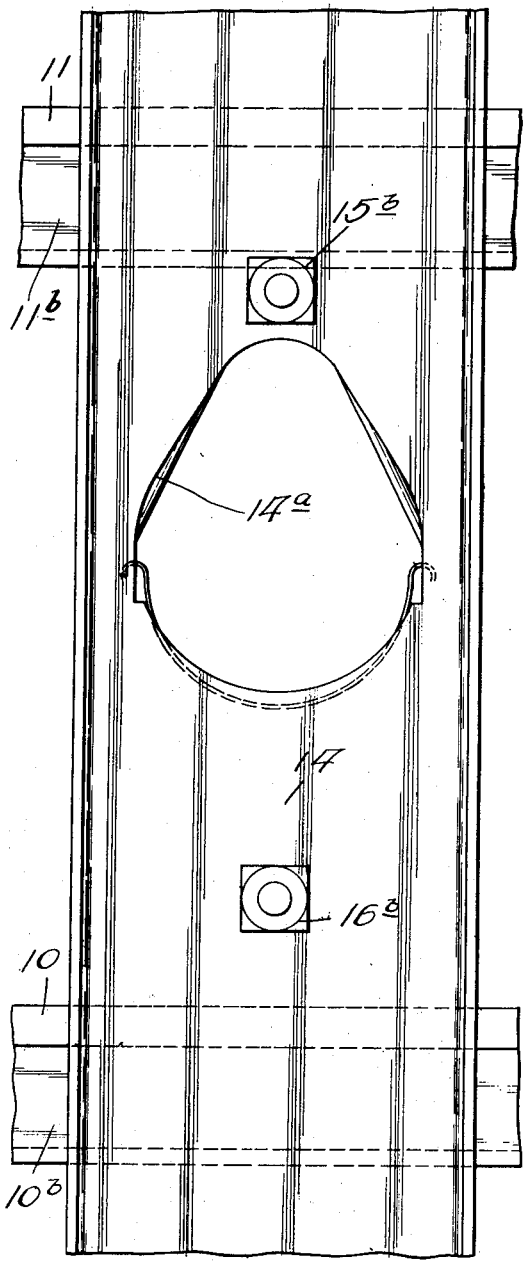

1,963,713

UNITED STATES PATENT OFFICE 1,963,713

POULTRY CAR

Frank X. Mudd, Oak Park, Ill.

Application January 30, 1933, Serial No. 654,347

3 Claims. (Cl. 119—12)

This invention relates to improvements in poultry cars and, more especially, to the water and feed trough construction therein.

My invention relates to an improvement in cars of the class employed for shipping live poultry and which, to that end, are provided with longitudinal series of coops in tiers at opposite sides of a central aisle, the coops being equipped with troughs for holding the feed and water for the poultry. The general construction of cars of this type is well known and need not be described here.

Among the features of my invention is the provision of a trough-supporting means which will maintain the trough in level position, afford access to the same from each side, and prevent undue crowding of the poultry.

Another feature of my invention is the provision of trough-supporting means which itself is easily removable as a unit for cleaning, replacement or repair purposes. My trough-supporting means is also constructed so that there is no undue restriction of light and air from the trough. The supporting means is also made so that the head room of the poultry is not limited.

In that form of device embodying the features of my invention shown in the accompanying drawings—

Figure 1 is a view in side elevation of my improved trough support with a trough therein; Fig. 2 is a view taken as indicated by the line 2 of Fig. 1; Fig. 3 is a view taken as indicated by the line 3 of Fig. 1; and Fig. 4 is a view taken as indicated by the line 4 of Fig. 1.

As shown in the drawings, 10 may indicate the floor of one row of coops and 11, the floor of the row above. 12 indicates the usual grating supported on the outside of the car from the side posts 13. The outer edges of the floors 10 and 11 are supported on the longitudinal members 10ᵃ and 11ᵃ, likewise carried on the side posts 13. The inner ends of the floors 10 and 11 are supported on the longitudinal members 10ᵇ and 11ᵇ carried by the aisle posts 14. As here shown, these aisle posts are formed of channel members.

15 indicates an upper slanting support, here shown as a bar or rod, carried between the aisle post 14 and the member 11ᵃ supporting the floor 11. 16 indicates a similar lower slanting support. The member 15 has its outer end provided with a hook 15ᵃ inserted in the member 11ᵃ and its inner end extends through a hole in the channel 14 and is fastened by the nuts 15ᵇ. The lower member 16 is similarly provided with a hook 16ᵃ entering the member 10ᵃ and its inner ends likewise supported from the channel 14, nuts 16ᵇ being provided. Since the members 15 and 16 are slanted to lie substantially parallel with the floors 10 and 11 (which slant downwardly and outwardly for draining and cleaning purposes), it will be seen that the space between the member 15 and the floor 11, and likewise the space between the member 16 and the floor 10, is substantially the same throughout the length of the coop. This eliminates any tapering or narrowed spaces in which the poultry are likely to catch their heads.

Supported between the upper and lower members 15 and 16, respectively, is a plurality of wire loops 17, each having an enlarged portion or opening 17ᵃ with a curved bottom or support 17ᵃ to embrace and support the trough 18. The curved bottoms or supports 17ᵃ are level, or in a horizontal plane, so that the trough 18, when placed inside of the loop 17, is supported in a horizontal position. The aisle post 14 is provided with an opening 14ᵃ to permit withdrawal of the trough 18 inwardly toward the aisle through such opening. The wire loop 17 may be welded to the members 15 and 16 in order to make the support more or less a unit construction. It will be seen that if the nuts 15ᵇ and 16ᵇ are removed, the bars 15 and 16 may be pushed outwardly to release the hooks 15ᵃ and 16ᵃ. The entire unit may then be turned on its side and entirely removed either outwardly or inwardly. If it is taken outwardly, the screen 12 will have to be removed by loosening the retaining clamps 12ᵃ and 12ᵇ. The wire loops 17 under the curved supporting portion 17ᵃ are closed, as indicated by 17ᵇ. That is, the two wires forming the sides of the loop are brought close together.

The wire loops 17, 17 are sufficiently spaced to permit access of the poultry to the trough 18 from each side. These loops prevent undue crowding of the poultry in feeding from the trough.

It is to be noted that the outer ends of the upper and lower members 15 and 16 are not supported from the outer car posts 13. The outer ends of the troughs 18 are preferably located between the outer posts 13 in order to afford more light and air to the same. In general, it is contemplated that there be as few of the outer posts 13 as possible. For example, there may be only six on one side of a car.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A trough support of the character described, including; a slanting upper member; a slanting lower member; a plurality of spaced wire loops carried by and between said members, each of said loops having an enlarged portion with a curved trough-supporting bottom, said bottoms lying in a substantially horizontal plane; and a trough supported in said loops on said curved bottoms.

2. In a poultry car having slanting coop floors, and an aisle post at the inner edges thereof; an upper member substantially parallel with said floors; a lower member substantially parallel therewith; a plurality of spaced loops supported by and between said members, each of said loops having an enlarged portion with a curved trough-supporting bottom, said bottoms lying in a substantially horizontal plane; and a trough supported in said loops on said curved bottoms.

3. A poultry car, including; slanting trough floors; supports for the floors at the outer edge; an aisle post at the inner edges of the floors; an upper bar under one floor and spaced therefrom, said bar having its outer end supported from the floor support and its inner end supported from the aisle post; a lower bar below said upper bar and above the adjacent floor below and spaced therefrom, said lower bar being parallel to the upper bar and having ts outer end supported from the floor support of said lower floor and its inner end supported by said aisle post; a plurality of wire loops carried by and between said bars, said wire loops being provided with enlargements having curved trough-supporting bottoms lying substantially in a horizontal plane; and a trough supported in said loops on said bottoms.

FRANK X. MUDD.